United States Patent [19]

Heger et al.

[11] Patent Number: 5,806,863
[45] Date of Patent: Sep. 15, 1998

[54] LARGE-CAPACITY TRANSPORT CONTAINER

[75] Inventors: Siegfried Heger; Thomas Korbmacher, both of Berlin, Germany

[73] Assignee: CTS Eurocontainer und Transport-Vermittlungs GmbH, Berlin, Germany

[21] Appl. No.: 649,675

[22] PCT Filed: Nov. 2, 1994

[86] PCT No.: PCT/DE94/01338

§ 371 Date: Aug. 15, 1996

§ 102(e) Date: Aug. 15, 1996

[87] PCT Pub. No.: WO95/12536

PCT Pub. Date: May 11, 1995

[30] Foreign Application Priority Data

Nov. 2, 1993 [DE] Germany .......................... 43 38 158.8
May 30, 1994 [DE] Germany .......................... 44 19 394.7

[51] Int. Cl.[6] .................................................. B65D 90/18
[52] U.S. Cl. .......................... 280/33.998; 16/34; 220/1.5; 206/596; 280/30
[58] Field of Search .............................. 414/498; 220/1.5; 206/596, 599; 280/33.998, DIG. 8, 79.3, 30, 47.131; 16/34

[56] References Cited

U.S. PATENT DOCUMENTS

| | | | |
|---|---|---|---|
| 2,956,699 | 10/1960 | Payne | 220/1.5 X |
| 3,178,216 | 4/1965 | Huber | 206/596 |
| 4,010,990 | 3/1977 | Rowley et al. | |
| 5,111,950 | 5/1992 | Wylenzek | 220/1.5 |
| 5,186,330 | 2/1993 | McClure | 220/1.5 X |
| 5,205,428 | 4/1993 | Yurgevich | 220/1.5 |

FOREIGN PATENT DOCUMENTS

| | | |
|---|---|---|
| 0 502 833 A1 | 9/1992 | European Pat. Off. . |
| 30 07 730 A1 | 9/1981 | Germany . |
| 81 20 121.4 | 2/1982 | Germany . |
| 31 13 083 A1 | 10/1982 | Germany . |
| 33 12 585 A1 | 10/1984 | Germany . |
| 37 22 889 A1 | 1/1989 | Germany . |
| 37 44 712 A1 | 1/1989 | Germany . |
| 39 22 813 A1 | 1/1991 | Germany . |
| WO 89/00138 | 1/1989 | Sweden ......................... 280/33.998 |

Primary Examiner—Brian L. Johnson
Assistant Examiner—Avraham Lerner
Attorney, Agent, or Firm—Michael J. Striker

[57] ABSTRACT

A high-capacity container has a receiving bracket for a hook, adjustable support rollers, upper straps which form forklift pockets, wherein slide rails are located under a container floor and connected to receptacle supports, support rollers are located in corner areas below the container floor to be pivoted-in and pivoted-out to be positioned in the container and in a plane below the corners, while the forklift pocket includes upper and lower straps, and a reinforcement is provided between and in the slide rails and a frame profile in the area of the forklift pockets.

23 Claims, 7 Drawing Sheets

LARGE-CAPACITY TRANSPORT CONTAINER

BACKGROUND OF THE INVENTION

The invention is directed to a large-capacity transport container in the form of a stackable ISO container for transporting bulk materials such as free-flowing construction materials, construction debris, garbage, industrial waste and the like.

In view of the multitude of transporting tasks, various systems have resulted for transporting material which are arranged parallel to and adjacent to one another. Depending on the distance of the destination to which the materials are to be transported, standardized ISO containers are used for transporting via ship and railroad, whereas interchangeable platforms, hook-roller containers or other systems are used for highway transport for short and medium distances. The two transporting systems which are geared to the use of large-capacity transport containers are not compatible.

Due to its standardized design, the ISO container which is used globally is very suitable for stacking and enables an extensive economical automation of the entire loading and unloading process. The ISO containers can only be picked up and deposited with the aid of special hoists which are provided at the respective loading locations in railroad terminals and ports. Specially designed ISO corners, as they are called, are specified in construction guidelines for the fastening of loading devices and for anchoring during transport. For short distances, containers are transported by trucks which are outfitted with special platforms. As a rule, the trucks are loaded and unloaded by the hoists available at the loading locations or this can be carried out only with expensive and heavy automatic loading devices or other auxiliary loading means. Possibly owing to the specific conditions under which the ISO containers can be picked up and deposited and the exactly defined standards for their construction, these large-capacity transport containers are used only for long-distance transport and seldom for short- and medium-distance transport in spite of their logistical advantages. Due to the absence of hoists or special lifting mechanisms in the transport vehicles, ISO containers are too unwieldy and accordingly unsuitable in an economic respect for transporting tasks which are carried out in rotation or on a daily basis, e.g., for deliveries to or pickups from construction sites.

Numerous solutions have already been proposed for increasing the mobility of large-capacity transport containers for short- and medium-distance operation and to facilitate the picking up of containers and the depositing of containers on a transport vehicle.

For example, DE 39 22 813 A1 proposes an auxiliary container traveling gear which is arranged at one end face of the container and is outfitted with means for engaging in adjacent bottom ISO corners. Support rollers are so disposed at the auxiliary traveling gear of the container in the extension of the lateral line of the container that the container can move in the horizontal direction on the rollers when lifting the free opposite end face. In order to pick up the container from the transport vehicle, this transport vehicle must be outfitted with a special pickup arrangement. The proposed auxiliary traveling gear can be arranged on any ISO container without converting the transport container. For this purpose, however, the auxiliary traveling gear must be available at the loading location or must always be carried along on the transport vehicle with the special pickup arrangement.

DE 33 12 585 A1 discloses an auxiliary traveling gear for large-capacity transport containers which has a rear driving axle and a front steering and driving axle which can be coupled to and uncoupled from the frame of the transport container simply and quickly. For this purpose, upper and lower catch pieces are arranged at the front and rear end faces of the transport container, the front and rear axles being inserted and bolted therein. Further, hydraulic work cylinders are fitted between the lower catch pieces and the side bracing to lift the container when acted upon by pressure so that the container can be transported by the auxiliary traveling gear. The auxiliary traveling gear according to DE 33 12 585 A1 has the disadvantageous characteristics described above, and special transport vehicles with the appropriate container pickup arrangements must be used for transporting over short and medium distances. Additional design modifications would be required in order to transfer this solution to ISO containers, since the standardized dimensions of an ISO container may not be exceeded by arranging catch pieces for the front and rear traveling gear and substantially higher weights must be received by the traveling gear when the containers are loaded.

Further, numerous suggestions are known—EP 0 502 833 A1, DE 30 07 730 A1, U.S. Pat. No. 4,010,990, DE-GM 81 20 121—for depositing a large-capacity transport container or an ISO container on a transport vehicle and picking it up again by means of vertically adjustable support elements. These systems likewise require special transport vehicles and are only applicable for ISO containers if they can be integrated in the construction design of an ISO container so as to remain within the existing standard dimensions. A fast and simple deposit and pickup of containers in container traffic for carrying out delivery or removal tasks on a daily basis or at short intervals is not possible with these devices.

According to D 37 44 712 A1, a bulk-material container having an end face which is supported in an articulated manner and which is constructed as a locking flap is lifted from and deposited on a transport vehicle outfitted with a hook in a facilitated manner and the manipulation of this bulk-material container is improved in that support rollers are arranged below the container bottom at telescopically extensible supports which are directed downward diagonally and can be secured in their extended state. For this purpose, the telescoping supports are so arranged that the support rollers in the retracted position lie within the standard dimensions of the container. The use of this support roller arrangement for ISO containers requires a holding clip for the hook, which holding clip must be arranged and constructed so as to meet the standard dimensions for the ISO container and the standard height for attachment of the hook. In addition, the telescopic construction of the support roller carrier is relatively expensive, requires substantial space and can lead to operating disturbances if the portions of the carrier which slide within one another are damaged.

The construction design of a hook-roller container is primarily governed by the conditions for short- and medium-distance transport of bulk materials by truck. The advantage of this container transport system consists in the high degree of mobility resulting from unrestricted access to any use site and in that the roller container can be deposited and picked up simply and quickly by means of the hook provided on the transport vehicle regardless of location and time and without additional technical outfitting. Its chief disadvantage consists in that all roller containers in the laden state can only be stacked under certain conditions and, when transported over greater distances, the available cargo space in a railroad car or in a ship cannot be exploited to its full extent because of the design dimensions, since different transport container standards are used for railroad cars and ships. To improve the stacking capability of laden roller containers in particular, DE 31 13 083 A1 and DE 37 22 889 A1 provide sliding elements and rollers which are arranged at the container so as to be partially adjustable and which cooperate with the upper longitudinal edge of the next lowest container in the stack. The stacking of roller containers, which can only be carried out under certain conditions, is not drastically improved by these steps. In addition, there is still the disadvantage that the cargo space available in railroad transport, for instance, cannot be fully utilized due to the design of the roller containers.

SUMMARY OF THE INVENTION

Therefore, the object of the present invention is to outfit an ISO container in such a way that it can be used as a roller container for short- and medium-distance transport with existing transport vehicles.

This object according to the invention is met when the slide rails are disposed under the container floor and connected with the receptacle supports, support rollers which can be pivoted out are disposed in corner areas of the container below the container floor in such a way that in the pivoted-in position they are positioned within the ISO container standard and in the pivoted-out position are positioned in a plane below the ISO corners, the forklift pockets consists of an upper strap which penetrates through the slide rails and a longitudinal support, and a lower strap, wherein means for reinforcement are provided between and in the slide rails, and on the frame profile of the container in the area of the forklift pockets.

The present solution produces compatibility between the ISO containers used for long-distance transportation and the transporting systems for roller containers in a relatively simple manner. ISO containers which are outfitted in accordance with the invention can be deposited or picked up directly at the respective site by means of transport vehicles for hook-roller containers and, since unrestricted stacking is also ensured, can be used subsequently for long-distance transporting, e.g., via railroad, to a remote processing or disposal facility while making full use of the available transport capacity.

The present invention can be used for half-height ISO containers as well as for ISO containers of different lengths.

As a result of another proposed construction and arrangement of the holding clip for the hooks, the support rollers, and the slide rails, existing ISO containers can be converted relatively quickly and economically. Highly dependable operation and uncomplicated handling are achieved in that the holding clip and support rollers are simply swiveled in and out and in that the position is secured in a simple manner by insert pins.

Owing to the proposed arrangement and construction of fork pockets according to further features, hook-roller containers and ISO containers which are designed as hook-roller containers can also be reliably moved without restrictions by forklifts as well as by the previously used hoists and transport equipment and the transporting and loading processes with containers of the generic type mentioned above can accordingly be designed in a more economical manner.

As a result of the pressure spring, according to a further feature, which is provided in a tilting arrangement and is tensioned between a spring bearing, which is rotatably arranged at the web plates, and a stationary spring bearing provided at the support roller axle, the support arms with the support rollers are always held in their end positions.

When the tilting point is overcome after traversing half of the swivel path, the working position is reached with assistance by the spring force, a portion of the inertia forces of the supporting arms and the support roller being compensated for by the spring, and the operator need only exert a relatively slight force to swivel the support roller completely into the end working position.

After the support arms supporting the support rollers are unlocked manually, the support rollers can be swiveled out of or into the respective end position virtually automatically so as to be mechanically supported by means of energy-storing elements such as a pneumatic spring or by hydraulic work cylinders and pressure cylinders. At the same time, the hydraulic work cylinders lock the support arms with the support rollers in the respective end position. The mechanical effort required to support the swiveling movements can be substantially reduced by means of this solution.

All means provided for the transport of ISO containers on a transport vehicle for roller containers lie within the allowed standard dimensions for ISO containers when occupying their rest position or initial position so as to fully retain the logistical advantages of this large-capacity transport container system and transport container traffic as a whole can be further automated since the absence of contingency unloading and loading processes results in a direct logistical connection between destinations.

BRIEF DESCRIPTION OF THE DRAWINGS

The invention will be explained more fully in the following with reference to an embodiment example.

DESCRIPTION OF PREFERRED EMBODIMENTS

Figure 1:
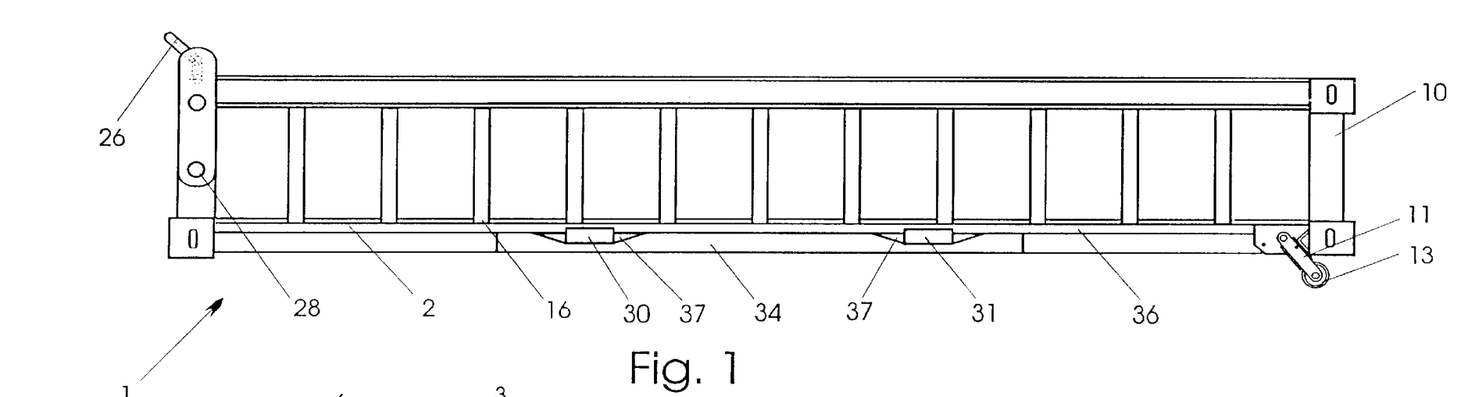
FIG. 1 shows a side view of the ISO container which is converted according to the invention.
Figure 2:
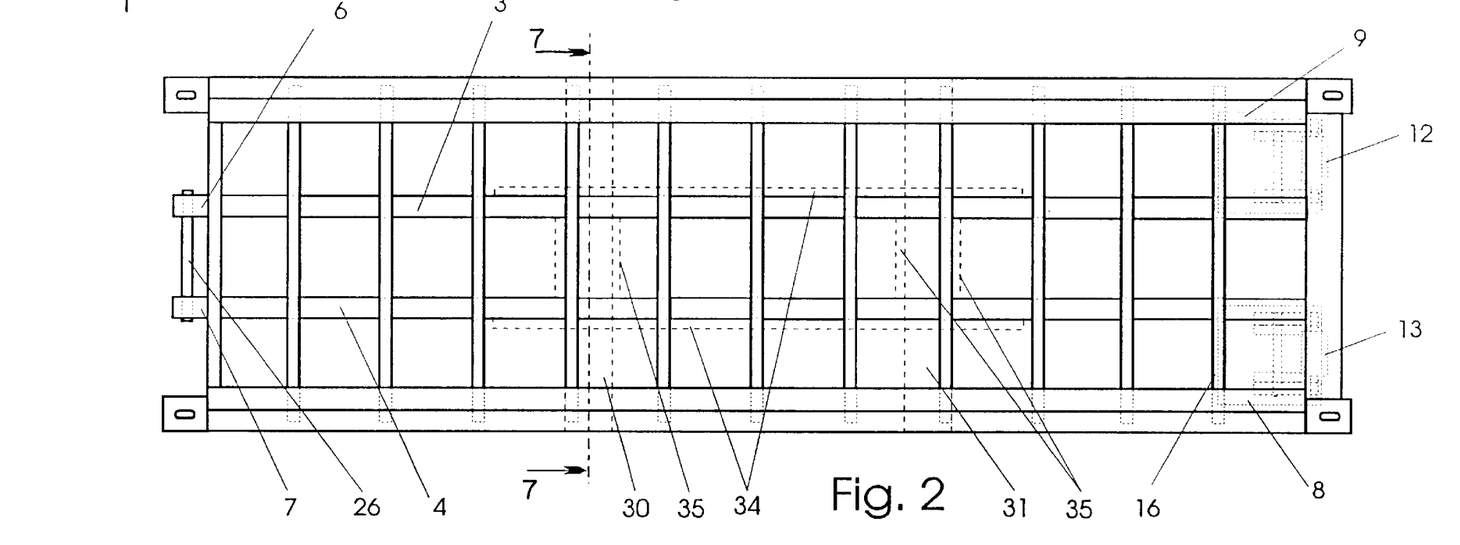
FIG. 2 shows a top view of FIG. 1.

The container which is shown schematically in FIGS. 1 and 2 in the form of a stackable, open ISO container 1 is outfitted at its front end face 5 with a vertically adjustable and movable holding clip 26 and at the opposite end face 10, in corner regions 8; 9 of the container bottom 2, with support rollers 12; 13 which can be swiveled in and out. Slide rails 3; 4 are provided below the container bottom 2 so that the container 1 can be received on the guide rollers or on a receiving arrangement of a transport vehicle for roller containers. The slide rails 3; 4 lie within the container standards for ISO containers and are welded with the transverse ribs 16 of the container 1. The slide rails 3; 4 protrude from the region of the container bottom 2 at the front end face 5 and are connected in a stationary manner with the holding supports 6; 7 which are arranged at the front end face 5 and which likewise lie within the container standards. The supporting system formed of the holding supports 6; 7 and slide rails 3; 4 ensures the torsional rigidity of the ISO containers when picked up from and deposited on a transport vehicle outfitted with a hook and ensures that the container 1 is held without slipping when transported over highways.

Figure 3:
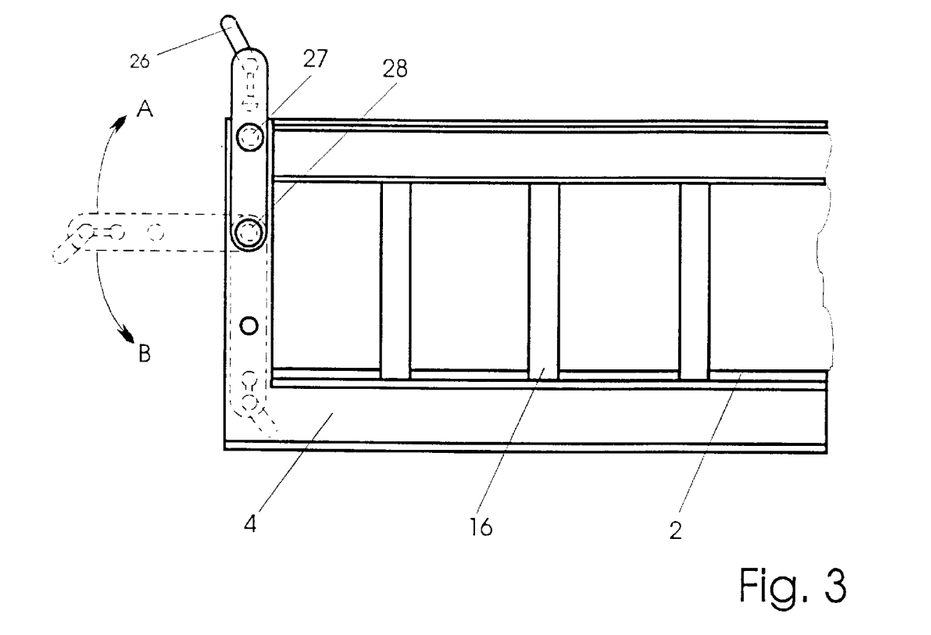
FIG. 3 shows a side view of the front portion of the container according to FIG. 1.
Figure 4:
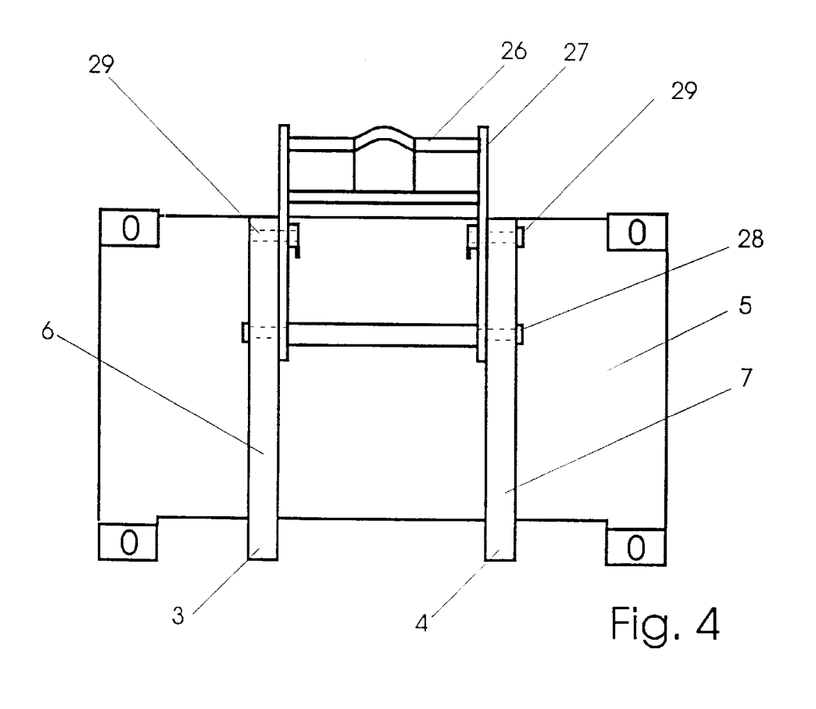
FIG. 4 shows a front view of the container with the holding clip for the hook, which holding clip is shown in the working position.

The holding clip for the hook is advantageously arranged in a cross-arm 27—FIG. 3—which is arranged between the holding supports 6; 7 so as to be movable by swiveling about the axle 28. In its rest position or initial position, the holding clip 26 is in a swiveled in position which does not exceed the standard dimensions of the ISO container and which is secured by insert pins 29. In this position, the holding clip 26 itself advantageously projects into the free space between the slide rails 3; 4. In order to pick up the container 1 and deposit it again by means of a hook, the holding clip 26 is brought into its upper working position by the swiveling of the cross-arm 27 about axle 28 and is secured in this position by means of insert pins 29. The arrangement of the holding clip 26 in a cross-arm 27 has the additional advantage that the height for access by the hook can be changed by changing the location of the axle 28 along the holding support 6; 7 and can be adjusted in accordance with the respective standards.

Figure 5:
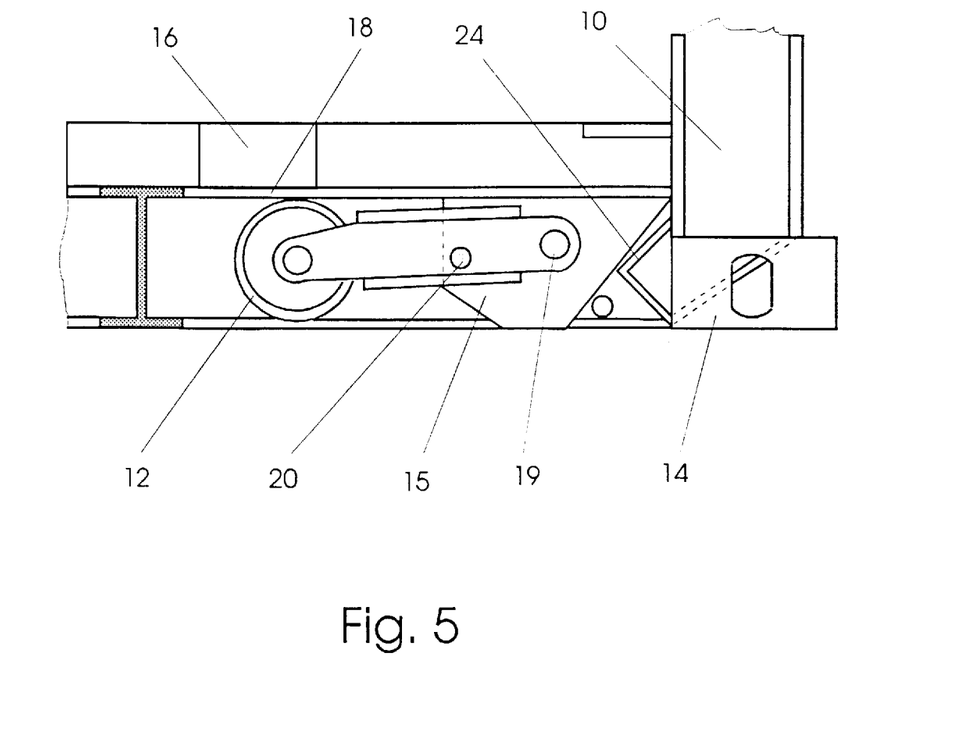
FIG. 5 shows the arrangement of the support rollers in the rest position.

For the purpose of transporting the container 1 during the pickup and depositing process, support rollers 12; 13 which are rotatably supported at support arms 11 are arranged in the corner regions 8; 9 below the container bottom 2 in a swivelable manner. These support rollers 12; 13 are likewise positioned within the container standard in their initial or rest position—FIG. 5—which position is secured in a first embodiment form by insert pins 20, and exceed the container standard in their working position—FIG. 6. The support rollers 12; 13 are arranged so as to be situated in an extended vertical plane of the end wall 10 and in a horizontal plane below the ISO corners 14. The support arms 11 are H-shaped and are formed of brackets 21 which are connected with one another by upper and lower fitting pieces 22; 23. The support roller 12; 13 is rotatably supported on an axle 25 between the free ends of the brackets 21. The support arm 11 which is formed of the brackets 21 and the fitting pieces 22; 23 are articulated in a swivelable manner by means of pins 19 at two web plates 15 which are in turn welded at a support plate 18. The support plate 18 is arranged in a stationary manner at a transverse rib 16 of the container 1 and at the supporting frame of the end wall 10.

Figure 6:
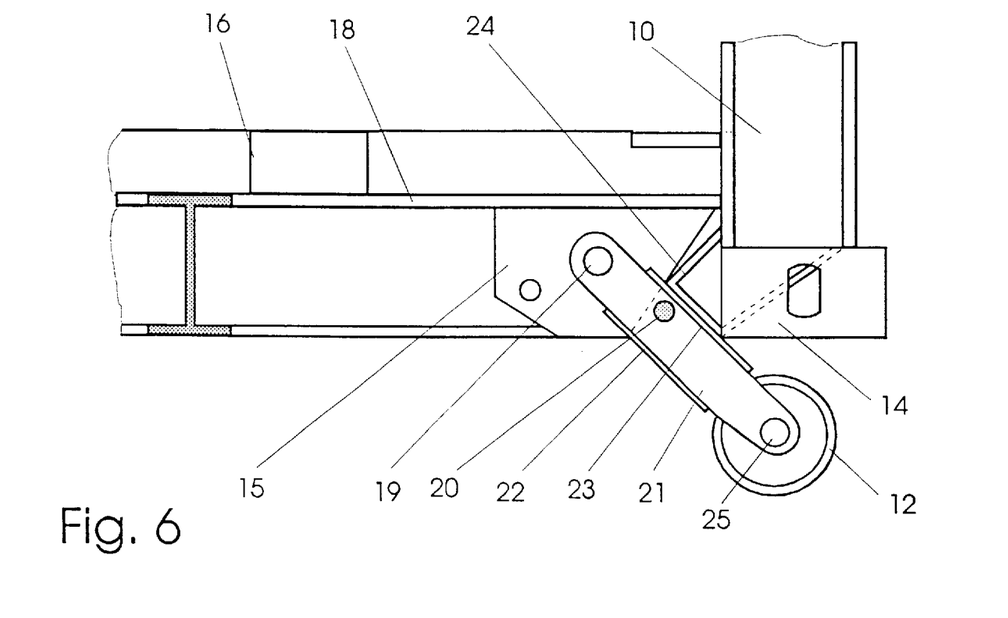
FIG. 6 shows the arrangement of the support rollers in the working position.

The support arm 11, which is secured in its swiveled out working position by an insert pin 20, tightly contacts a stop angle 24 by its upper fitting piece 23 and in this way ensures that the relatively high forces occurring when picking up and depositing the container will be reliably transmitted to the supporting construction of the container 1.

For this purpose, according to another feature of the invention, recesses 49 are provided in the stop angle 24 for receiving pins 57 which are arranged at the support arms 11. An additional locking of the working position of the support rollers 12; 13 is effected by means of the pins 57. At the same time, the axial forces occurring when the container 1 is picked up and deposited are reliably transmitted to the stationary stop angle 24 via the pins 57 and are also conducted into the container frame to relieve the support roller arrangement.

When the ISO container which is used as a roller container for short- and medium-distance operation is converted for the purpose of long-distance transport by rail or ship, the container is picked up by the hoists provided at the loading location and the support rollers 12; 13, which are in the working position and exceed the container standards when so arranged, and the holding clip 26 are then swiveled back into the respective initial or rest position and secured by the insert pins 20; 29. The converted container now corresponds again to the ISO standard and can be stacked in the available transporting space in a known manner. When the ISO container is converted from long-distance transport to short- or medium-distance operation for transport via motor vehicles, the conversion into a hook-roller container for highway traffic is effected in the opposite manner.

Further, the ISO container 1 which is constructed as a hook-roller container is outfitted with fork pockets 30; 31 which are arranged symmetrically with respect to the axis of symmetry of the longitudinal wall of the container and are disposed at a distance from one another in accordance with the conventional dimensions established by the international transport authority. Guiding and stiffening plates 37 are connected to the end faces of the fork pockets 30; 31 and are welded securely to the frame section 36 of the ISO container 1. Although these guiding and stiffening plates 37 are not absolutely essential to the stability of the fork pockets 30; 31, they reliably prevent a displacement of the fork pockets 30; 31 when the latter are loaded laterally and, at the same time, serve as auxiliary guide means for the insertion of the transporting fork of a forklift.

Figure 7:
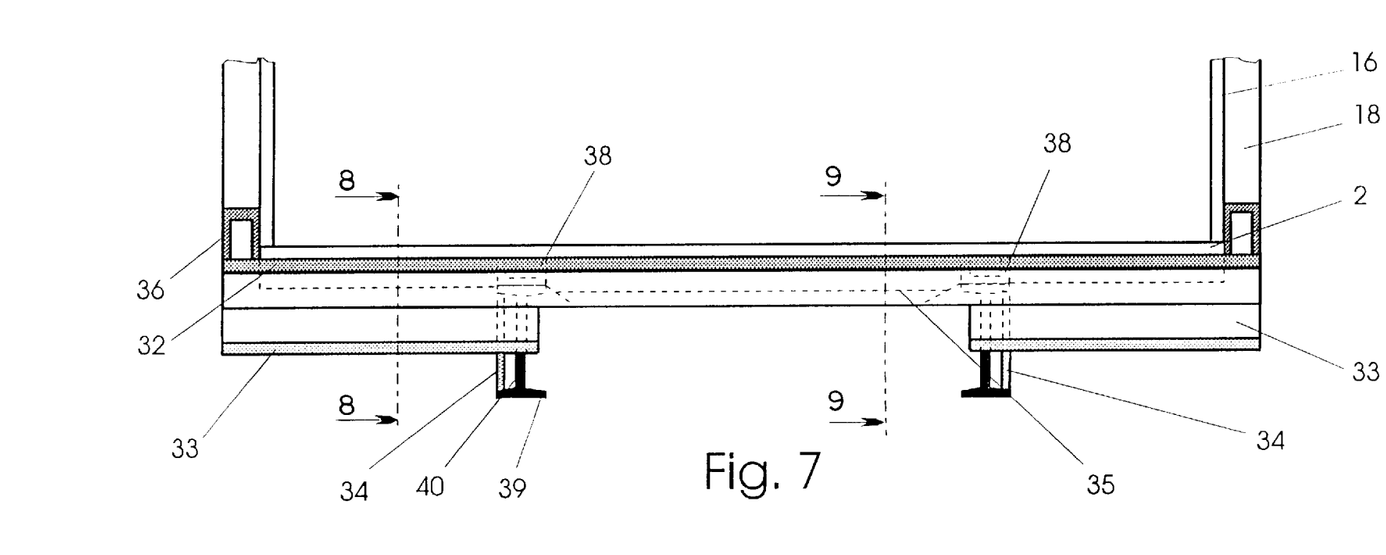
FIG. 7 shows cross section 7—7 from FIG. 2 through the container in the longitudinal axis of the fork pocket.
Figure 8:
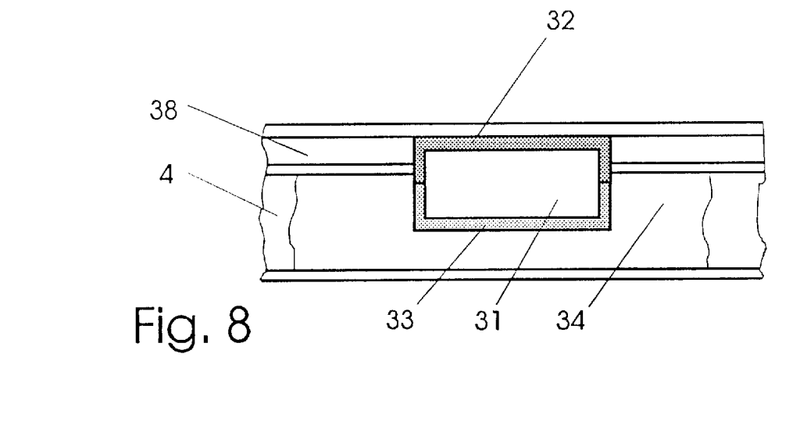
FIG. 8 shows section 8—8 from FIG. 7.
Figure 9:
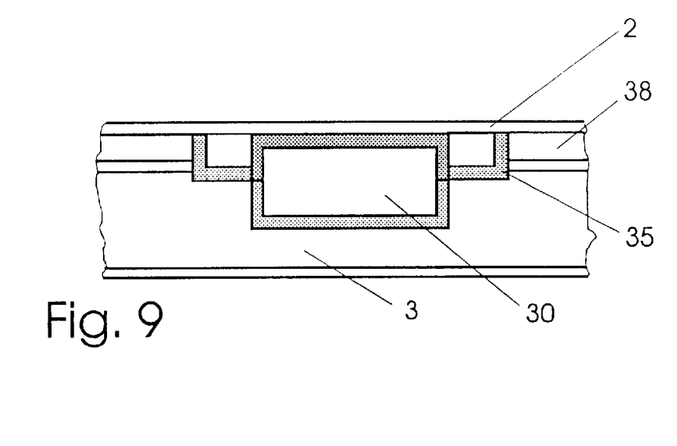
FIG. 9 shows section 9—9 from FIG. 7.
Figure 10:
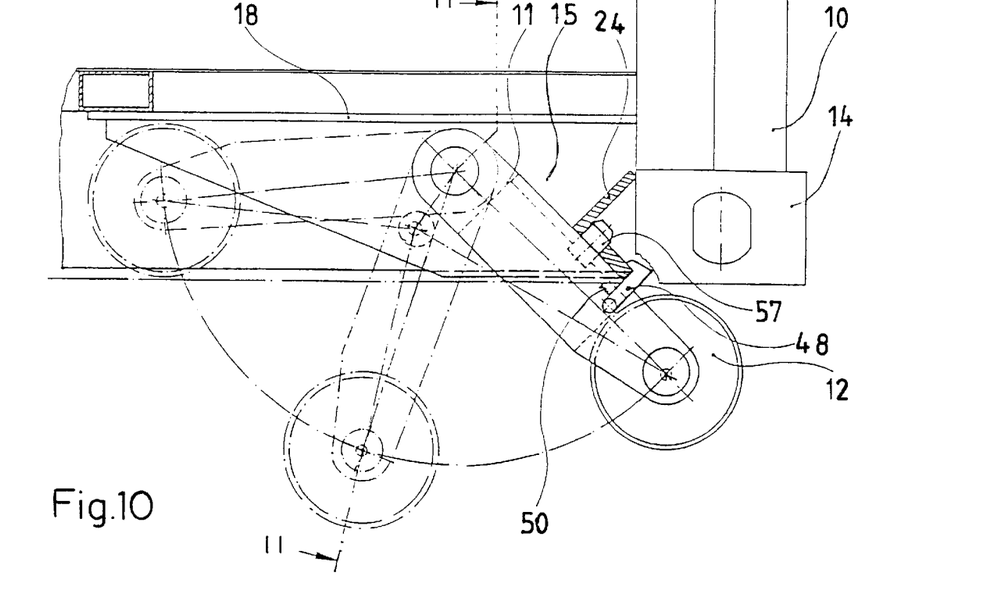
FIG. 10 shows a side view of a first embodiment form of a swivel arrangement for the supporting rollers.

The fork pockets 30; 31—FIGS. 7 to 9—are formed of a U-shaped upper flange 32 and a U-shaped lower flange 33 which are welded together in their axis of symmetry.

As is shown in FIGS. 2 to 7, the upper flange 32 which is welded with the container bottom 2 extends along the entire breadth of the container and penetrates, at the respective locations, the longitudinal support 38 and the slide rails 3; 4 which are arranged at the longitudinal support 38. On the one hand, this ensures that the transporting fork of the forklift can be placed under the container 1 completely and without difficulty for picking up and depositing the container and that the transport means and fittings for hook-roller containers can be used further for transporting the container 1 in short- and medium-distance traffic. On the other hand, the openings in the longitudinal supports 38 and slide rails 3; 4 which are compulsory for a reliable placement of the transporting fork of the forklift necessarily lead to a considerable decrease in the overall stability of the container 1. In order to remedy this situation, it is necessary to take additional steps which, however, may not interfere in any way with picking up, depositing and transporting the container by means of forklifts or with the transport vehicles for hook-roller containers. Further, these steps must also conform to the standard dimensions for ISO containers so as to further ensure the full stacking capability of the ISO container which is constructed as a hook-roller container.

For this purpose, according to the present invention, stiffeners 35, which are preferably formed of an angle section, are welded in between the two longitudinal supports 38. These stiffeners 35 are connected in a stationary manner with the longitudinal supports 38 and slide rails 3; 4 as well as with the longitudinal sides of the upper flange 32 and with the container bottom 2—FIG. 7.

Further, stabilizing plates 34 which generously overlap the region in which the fork pockets 30; 31 are arranged and which are welded with the longitudinal support 38 and the base 39 of the section of the slide rails 3; 4 so as to enclose the upper and lower flanges 32; 33 are arranged on the outer sides of the longitudinal supports 38 and slide rails 3; 4—FIGS. 1, 8 and 9.

The upper flange 32 which extends along the entire breadth of the container 1 results in a substantial stabilization of the container bottom 2 and, together with the stiffeners 35, absorbs the forces occurring in this region while simultaneously ensuring the necessary free space for the loading techniques to be employed by means of forklifts and/or transport vehicles for hook-roller containers.

The lower flanges 33 which are guided from the outside to the inside as far as the slide rails 3; 4 reinforce the container 1 and likewise serve to ensure the overall stability of the container 1 in cooperation with the stabilizing plates 34.

In order to effect a decisive reduction in the expenditure of manual force for swiveling the support roller arrangement, energy-storing elements which mechanically support the swiveling process and lead to a reduction in the required expenditure of force are arranged in a tilting arrangement at the web plates 15.

Figure 11:
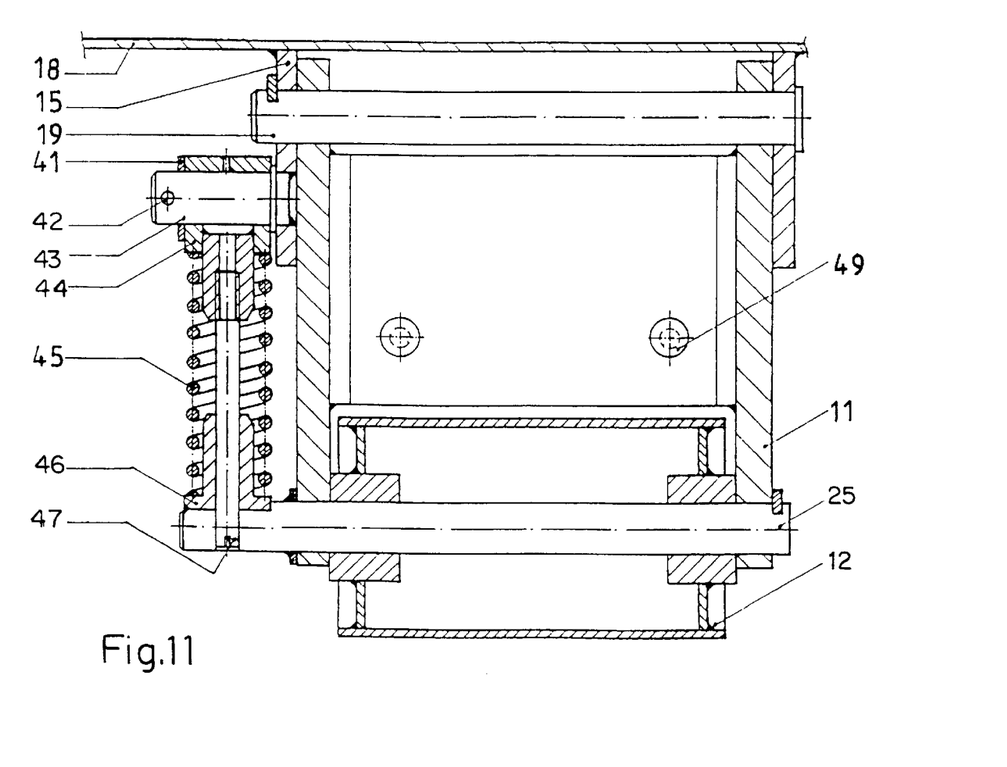
FIG. 11 shows section 11—11 from FIG. 10.

As will be seen from FIG. 11, a pin 43 is fitted at the web plates 15 so as to be fixed with respect to rotation relative thereto. A rotatable spring bearing 44 which is secured axially by a washer 41 and a split-pin 42 is arranged on the pin 43 and is in a working connection with the support roller axle 25 via a centering pin 47 which is guided in a rigid spring bearing 46 on the support roller axle 25 and is screwed into the rotatable spring bearing 44. A pressure spring 45 is pretensioned between the two spring bearings 44; 46 as an energy-storing element and supports the swiveling process mechanically by means of its tilting arrangement.

The working connection between the rotatable spring bearing 44 and the rigid spring bearing 46 via the centering pin 47 further ensures that the rotatable spring bearing 44 will be carried along in a compulsory manner in each phase of the swiveling movement.

When swiveling out of the rest position into the working position and vice versa, compulsory axial forces occur which may be absorbed by the pressure spring 45 under certain circumstances, which could lead to a reduction in the available spring forces. In order to overcome this drawback, the centering pin 47 is screwed into the rotatable spring bearing and is guided in the rigid spring bearing 46 on the support roller axle 25 and penetrates the roller axle 25. The axial forces occurring during the swiveling process are safely absorbed by the centering pin 47 and transmitted to the support roller 12; 13 or to the container frame via the support arm arrangement. The spring force of the pressure spring 45 is accordingly fully available for supporting the swiveling movement which is to be carried out manually.

In addition to the spring force of the pressure spring 45 which tends to hold the support arms 11 with the support rollers 12; 13 in their end positions, the working position and the rest position are additionally secured by a lock 48. The lock 48 is pretensioned by a spring 50 and engages behind the stationary stop angle 24 in the working position. The lock 48 also ensures that the rollers 12; 13 occupying their working position cannot swivel in during a rearward movement of the container.

The lock 48 is pretensioned by the spring in such a way that it can be unlocked easily by hand at the start of the swiveling process. After unlocking the lock 48, the spring force which holds the support arms 11, including the support rollers 12; 13, in their rest position is partially compensated for by the inertia forces of the support arm 11 and support roller 12; 13. Accordingly, considerably less manual force is required to perform the swiveling out process.

Figure 12:
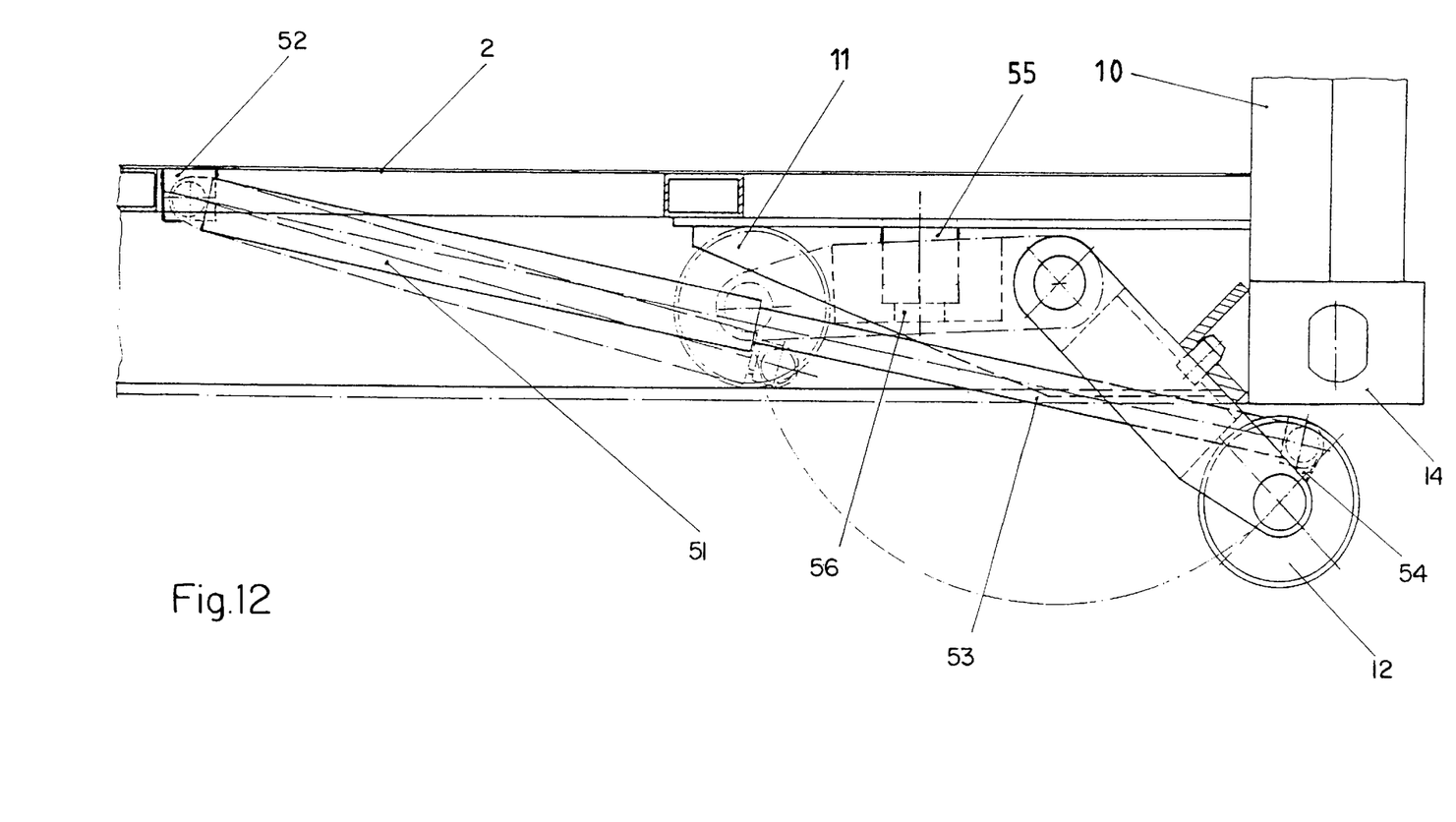
FIG. 12 shows a schematic view of the arrangement of hydraulic working cylinders and pressure cylinders for swiveling the support rollers.

FIG. 12 shows another construction variant which is applied in a particularly advantageous manner in ISO containers which are outfitted with a hydraulic pump.

The support roller 12 is swiveled out of its rest position into the working position and vice versa by means of a hydraulic work cylinder 51; 53 which also simultaneously locks and positions the support arm with the support roller 12 in the respective end position. The work cylinder 51; 53 is arranged in a swivelable manner via a holder 52 at the container bottom 2 and is articulated in the region of the support roller axle 25 so as to be rotatable by a holding flange 54.

Another pressure cylinder 55 with a limited stroke is provided at the container bottom 2 so that considerable inertia forces which can occur, e.g., at the start of the swiveling process from the rest position to the working position, can be overcome if necessary. The pressure piston 56 of the pressure cylinder 55 contacts the web of the U-section of the support arms 11.

Further, as a result of suitable dimensioning of the work cylinder and pressure cylinder 51; 55, it is also possible to overcome considerable inertia forces, e.g., those of a laden container, and to lift the laden container on one side by means of the support rollers 12; 13 which are arranged so as to be swivelable.

The two hydraulic cylinders 51 and 55 are connected, via pressure lines, with a hand pump for a work fluid (not shown), which hand pump is preferably available at the ISO container.

Figure 13:
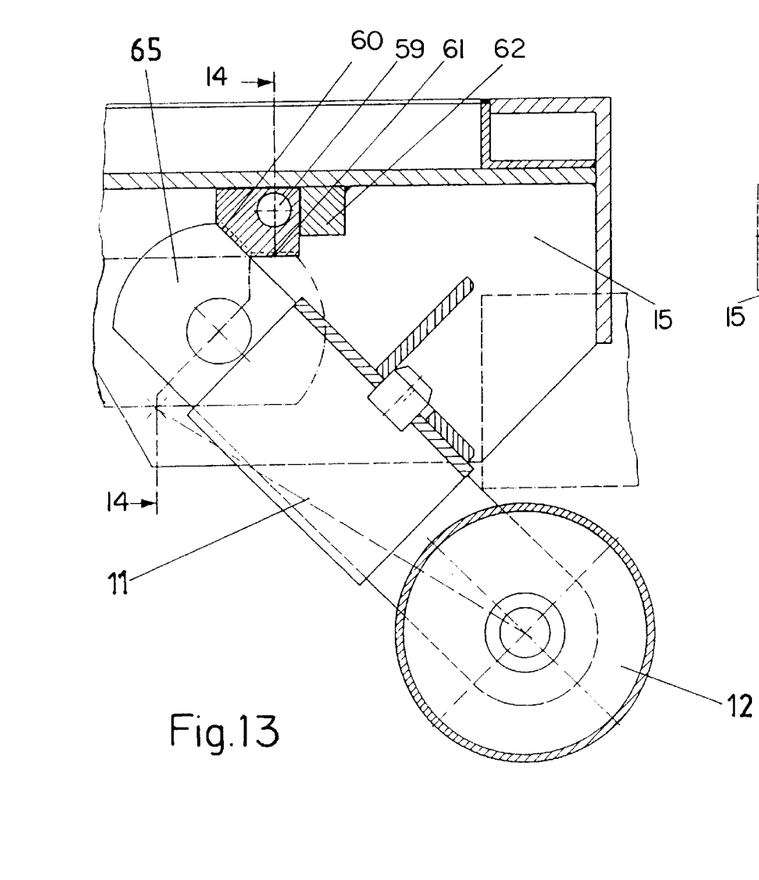
FIG. 13 shows another embodiment form for swiveling and locking the support rollers by means of a pneumatic spring and locking piece.
Figure 14:
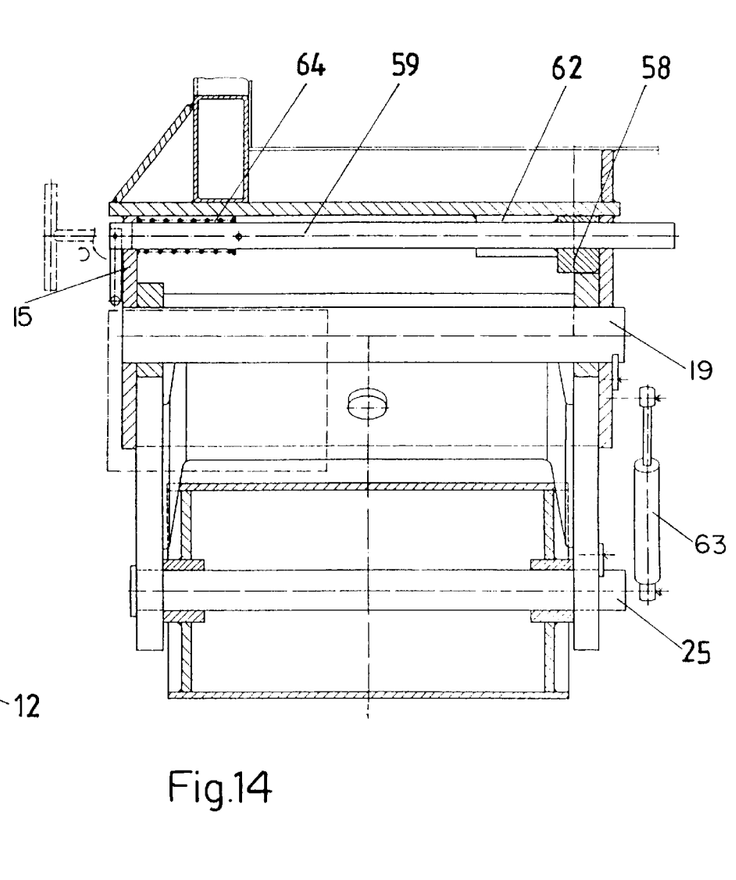
FIG. 14 shows section 14—14 from FIG. 13.

FIGS. 13 and 14 show another advantageous and economical variant for swiveling the support rollers 12; 13 using a pneumatic spring 63 and a locking piece 58 which locks the respective end position of the support arms 11 with the support rollers 12; 13. This solution is characterized by a relatively simple design and has the advantage that the swiveling process and the return to the end position after the locking piece 58 is moved from its rest and locking position takes place automatically.

The locking piece 58 is supported so as to be displaceable axially between the web plates 15 in a guide 62, which is welded with the support arm arrangement in a stationary manner, and is connected with a tie rod 59 which is pretensioned by the spring 64. The locking piece 58 has two work surfaces 60; 61 which are arranged at an angle relative to one another and which reliably lock the end position of the support rollers 12; 13 in cooperation with the brackets 21 of the support arms 11. By actuating the tie rod 59 which constantly holds the locking piece 58 in the locking and rest position, the support arm which contacts one of the work surfaces 60; 61 by one of its web plates 15 is released and swiveled with the assistance of the pneumatic spring 63 which is arranged between the support roller axle 25 and the pin 19. During the swiveling movement, the locking piece 58 slides along the cheek 65 of the bracket 21 of the support arm 11 and engages again in its rest position and locking position after the bracket 21 passes the work surface 60; 61.

Reference Numbers

1 ISO container
2 container bottom
3 slide rail
4 slide rail
5 front end wall
6 holding support
7 holding support
8 corner region
9 corner region
10 end wall
11 support arm
12 support roller
13 support roller
14 ISO corner
15 web plate
16 transverse rib
17 transverse support
18 support plate
19 pin
20 insert pin
21 bracket
22 fitting piece
23 fitting piece
24 stop angle
25 support roller axle
26 holding clip
27 cross-arm
28 axle
29 insert pin
30 fork pocket
31 fork pocket
32 upper flange
33 lower flange
34 stabilizing plate
35 stiffener
36 frame section
37 guiding and stiffening plate
38 longitudinal support
39 base
40 web
41 washer
42 split-pin
43 bearing pin
44 spring bearing
45 pressure spring
46 rigid spring bearing
47 centering pin
48 locking lever
49 recess
50 tension spring
51 hydraulic work cylinder
52 holder
53 piston
54 holding flange
55 pressure cylinder
56 pressure piston
57 pin
58 locking piece
59 tie rod
60 work surface
61 work surface
62 guide
63 pneumatic spring
64 spring
65 cheek

We claim:

1. A high-capacity container formed as a stackable container, comprising a receiving bracket which is movably disposed on a front wall for a hook; adjustable support rollers disposed on an opposite wall; two U-shaped upper straps which are spaced apart from each other, form forklift pockets and extend over the entire width of the container and are welded to a container floor; slide rails disposed under the container floor and connected with receptacle supports, the support rollers being pivotable out and disposed in corner areas of the container below the container floor in such a way that in a pivoted-in position they are positioned within the container and in a pivoted-out position they are positioned in a plane below corners of the container, the forklift pockets including an upper strap which penetrates through said slide rails and a longitudinal support, and a lower strap; and means for reinforcement provided between and in said slide rails and on a frame profile of the container in the area of said forklift pockets.

2. A high-capacity container as defined in claim 1; and further comprising stiffeners disposed between said side rails, said longitudinal support together with said slide rails being reinforced by stabilizing panels; and guide and reinforcement panels provided between said upper and lower straps and said frame profile.

3. A high-capacity container as defined in claim 2, wherein said means for reinforcement include angled profiles which are welded between said longitudinal supports of said slide rails and are fixedly connected with said upper strap and said container floor.

4. A high-capacity container as defined in claim 1, wherein said means for reinforcement include stabilizing panels which enclose said upper and lower straps on an outside and are fixedly connected with said longitudinal support and with a base of said slide rails.

5. A high-capacity container as defined in claim 1, wherein said lower strap ends at a respective one of said slide rails and is fixedly connected with said upper strap and said side rail.

6. A high-capacity container as defined in claim 1, wherein said support rollers are seated in support arms, said support arms being pivotably hinged by bolts on web plates which are fixedly connected with a support panel attached to transverse frames and to a lower transverse support of the front wall and are fixed in planes by socket pins in the pivoted-in and pivoted-out positions.

7. A high-capacity container as defined in claim 6, wherein said support arms are H-shaped and include brackets and adapter pieces fixedly connected with said brackets, so that when one of said support arms is pivoted-out an upper one of said adapter pieces rests free of play against a fastened elbow, and said support rollers being rotatably seated between free ends of said brackets on a support roller shaft.

8. A high-capacity container as defined in claim 7; and further comprising self-centering eccentric clamps which secure end positions of said support arms.

9. A high-capacity container as defined in claim 6; and further comprising a locking element which secures end positions of said support arms.

10. A high-capacity container as defined in claim 9, wherein said locking element is seated axially displaceable in a guide between said web plates and positioned in a rest position and a locking position via a draw bar pre-stressed by a spring force.

11. A high-capacity container as defined in claim 9, wherein said locking element has working surfaces which in respective end positions cooperate with brackets on said supporting arms.

12. A high-capacity container as defined in claim 1, wherein said receiving bracket for the hook is disposed between said receptacle supports so that said receiving bracket is pivotable and adjustable in height and is positioned within the container in a pivoted-in position.

13. A high-capacity container as defined in claim 12, wherein said receiving bracket is disposed in a cross-arm which is seated pivotable around a shaft between said receptacle brackets and is fixed in place by socket pins in the pivoted-in and pivoted-out position.

14. A high-capacity container as defined in claim 1; and further comprising force-storing elements which guide said support rollers into respective rest and working positions and are hinged to support arms in tilting devices and fixed in place on shafts of said support rollers; and pre-stressed locking levers which fix said support rollers in a respective end position.

15. A high-capacity container as defined in claim 14, wherein said force-storing elements are formed as compression springs.

16. A high-capacity container as defined in claim 14, wherein said force-storing element is a gas pressure spring.

17. A high-capacity container as defined in claim 14, wherein said force-storing element is a hydraulic work cylinder.

18. A high-capacity container as defined in claim 17, wherein said hydraulic force cylinder is disposed on the container floor by a receptacle and has a piston which is rotatably movably hinged on said support arms via a receiving flange.

19. A high-capacity container as defined in claim 17; and further comprising a pressure cylinder and a hydraulic hand pump, said work cylinder and said pressure cylinder being connected to said hydraulic hand pump.

20. A high-capacity container as defined in claim 1; and further comprising a web plate which has a seating pin on which a spring bearing is rotatably disposed and is operatably connected via a centering pin with a shaft of said support rollers, said centering pin being releasably fastened in a spring bearing and guided in another spring bearing; and a compression spring fastened on said shaft of said support rollers by said other spring bearing.

21. A high-capacity container as defined in claim 1; and further comprising bolts which fix an operational end position of said support rollers, said bolts being fastened on support arms and engage recesses of a fastening elbow; and a locking lever which is pre-stressed by a tension spring, extends behind said fastening elbow, securing the operational end position of said support rollers.

22. A high-capacity container as defined in claim 21, wherein said fastened elbow is fixed in place on a container frame.

23. A high-capacity container as defined in claim 1; and further comprising a hydraulic pressure cylinder which is fastened on the container floor and has a pressure piston cooperating with a support arm.

* * * * *